US006233581B1

(12) United States Patent
Rambaud et al.

(10) Patent No.: US 6,233,581 B1
(45) Date of Patent: May 15, 2001

(54) METHOD FOR PROCESSING AND ACCESSING DATA OBJECTS, PARTICULARLY DOCUMENTS, AND SYSTEM THEREFOR

(75) Inventors: Patrick Rambaud; Thierry Baroghel, both of Paris; Patrick Charré, Chatenay Malabry, all of (FR)

(73) Assignee: IMS Health, Cedex (FR)

(*) Notice: Subject to any disclaimer, the term of this patent is extended or adjusted under 35 U.S.C. 154(b) by 0 days.

(21) Appl. No.: 08/894,551

(22) PCT Filed: Feb. 27, 1995

(86) PCT No.: PCT/FR95/00229
§ 371 Date: Aug. 21, 1997
§ 102(e) Date: Aug. 21, 1997

(87) PCT Pub. No.: WO96/27161
PCT Pub. Date: Sep. 6, 1996

(51) Int. Cl.⁷ .................................................. G06F 15/00
(52) U.S. Cl. ............................ 707/102; 707/3; 707/514
(58) Field of Search ...................... 707/500, 514, 707/1–3, 102, 103, 104

(56) References Cited

U.S. PATENT DOCUMENTS

| | | | | |
|---|---|---|---|---|
| 4,429,385 | * | 1/1984 | Cichelli et al. | 705/30 |
| 4,870,576 | * | 9/1989 | Tornetta | 705/1 |
| 4,907,274 | * | 3/1990 | Normura et al. | 380/30 |
| 5,032,989 | * | 7/1991 | Tornetta | 705/1 |
| 5,193,110 | * | 3/1993 | Jones et al. | 379/93.14 |
| 5,325,466 | | 6/1994 | Kornacker . | |
| 5,369,763 | | 11/1994 | Biles . | |
| 5,570,291 | * | 10/1996 | Dudle et al. | 700/95 |
| 5,630,125 | * | 5/1997 | Zellweger | 395/614 |
| 5,832,470 | * | 11/1998 | Morita et al. | 707/1 |
| 5,875,446 | * | 2/1999 | Brown et al. | 707/3 |
| 5,897,619 | * | 5/2000 | Hargrove, Jr. et al. | 705/4 |
| 5,930,474 | * | 7/1999 | Dunworth et al. | 395/200.47 |
| 6,061,657 | * | 5/2000 | Wical | 706/45 |

FOREIGN PATENT DOCUMENTS

| | | |
|---|---|---|
| 0601759 | 6/1994 | (EP) . |
| 0631245 | 12/1994 | (EP) . |
| WO 9412944 | 6/1994 | (WO) . |

OTHER PUBLICATIONS

Networked Documentation System: New Challenges in the 1990s, the Seybold Report on Publishing Systems, vol. 19, No. 14, pp. 18–28, Apr. 1990.*
Zue, Toward Systems that Understand Spoken Language, IEEE Expert, vol. 9, pp. 51–59, Dec. 1994.*
Dennis S. Arnon et al., Using Structured Documents for Implementing Product/Service Yellow Pages Architecture on the Internet, pp. 312–321, Dec. 1994.*

(List continued on next page.)

Primary Examiner—Heather R. Herndon
Assistant Examiner—Cong-Lae Huynh
(74) Attorney, Agent, or Firm—Greer, Burns & Crain, Ltd.

(57) ABSTRACT

A method for processing and accessing data objects including a step (II) of gathering collected data objects (D) into groups of objects (DP1, DP2, DPM) associated with respective geographical areas (P1, P2, PM), a step (III) of classifying each object according to several categories of objects (DB1, DR1, DN1), a first step (IV) of classifying the objects into at least one of the object categories (DB1) according to an index common to all the object groups (DP1, DP2, DPM), and a second step (V) of classifying a part of the collected objects forming a particular group of objects (CR1, CR2, CRM) according to a second so-called hierarchical classification scheme (PH) common to all the object groups (DP1, DP2, DPM). The method further includes a step of navigating through selected geographical areas via either of the first and second classification schemes (PT, PH). The method is particularly useful for distributing and accessing documents on medical and pharmaceutical regulations.

8 Claims, 3 Drawing Sheets

Figures 1, 1A:
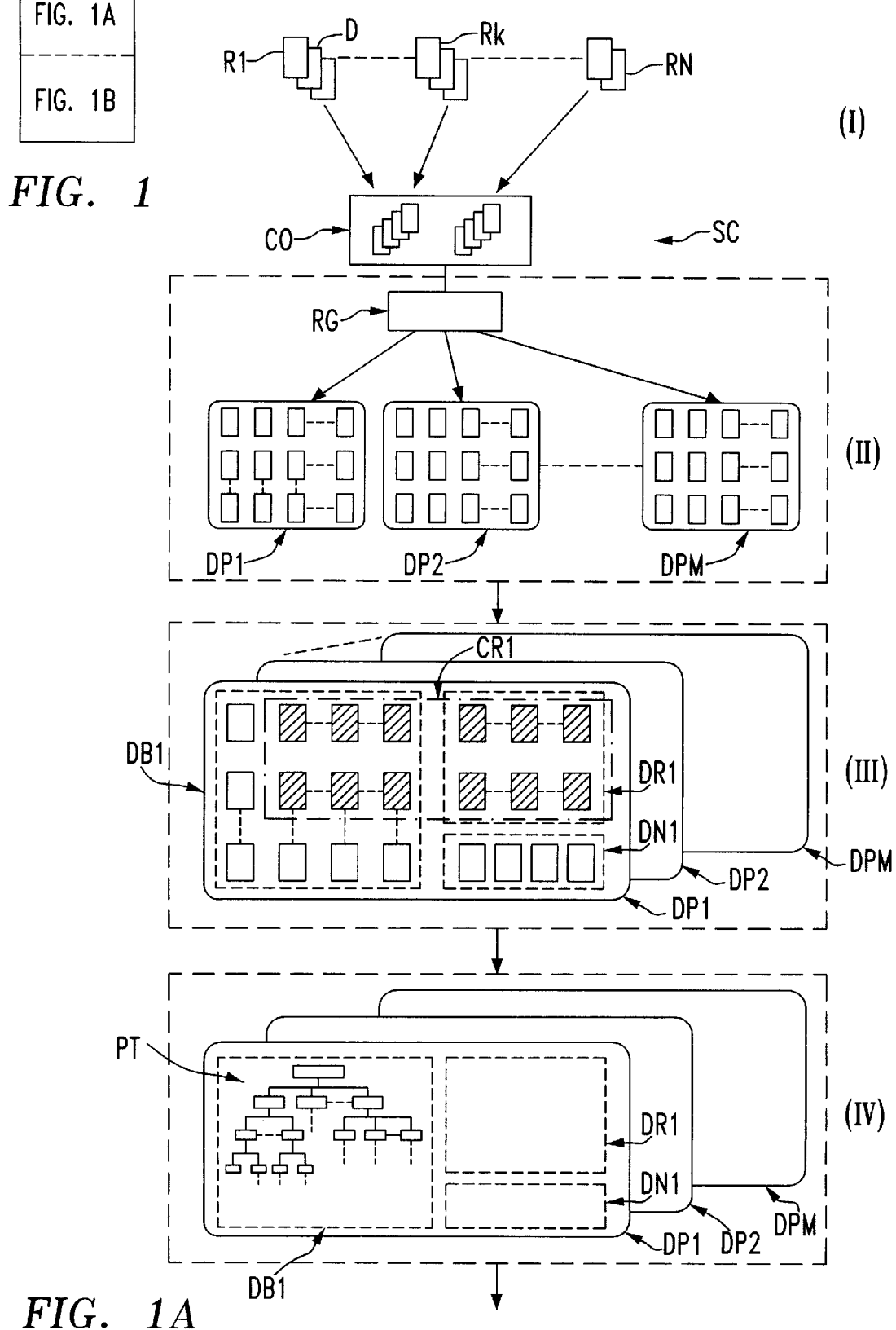

OTHER PUBLICATIONS www.yahoo.com/info/misc/history.html, p. 1, Dec. 1994.*

Mark Brown et al., Special Edition Using Netscape 2, pp. 182–207, Jan. 1995.*

Damiani et al., A Terminological Approach to Business Domain Modelling,, Database and Expert System Applications: Proceedings of the Int's Conference in Vienna, Austria, pp. 340–345, 1990.*

* cited by examiner

METHOD FOR PROCESSING AND ACCESSING DATA OBJECTS, PARTICULARLY DOCUMENTS, AND SYSTEM THEREFOR

DESCRIPTION

The present invention relates to a method for processing and accessing information objects, especially documents. It also envisages a system for implementing this method.

The considerable growth in information exchange in all fields of human activity, especially in the economic field, has been made possible by the development of methods and systems for processing and communicating information. Mention may be made here of the development of databases which may be easily accessible on-line via telecommunications networks. Another, off-line, database consultation mode which is currently being widely developed consists in using permanent information media, especially CD-ROM (Compact-Disc Read-Only Memory) or CD-I (Interactive Compact Disc) discs, which are consulted by persons using appropriate disc drives associated with microcomputers. This consultation mode is meeting with increasing success due to the very high storage capacities of the CD-ROM discs and the possibility of locally processing and storing the information consulted. The CD-ROM discs produced and distributed by the operator or the manager of the database generally include software consultation modules, in addition to the consultable data, while the microcomputer to which the CD-ROM drive is connected is equipped with resident search and processing software.

The objects now stored on CD-ROM discs are very diverse, since, in the multimedia applications, these objects include not only computer data, graphics objects, sound elements or even video or animation sequences. The consultation software associated with the CD-ROM drives currently already offers very extensive facilities for searching and accessing information, and for processing and displaying this information. Hence a user can navigate from one information object to another, depending on his objectives and on his routing within a structured object database. Although the very high storage capacity of a medium of CD-ROM type allows problem-free storage of a large number of document pages, it nevertheless becomes difficult, even for a practised user, to gain access in a reasonable time to an information object being searched for, when the database includes several thousand documents.

An information object is understood to be a set of codes and signs constituting a coherent whole representing data, information of all kinds, text, graphics, image or sound.

A document is understood to be a set of coherent information or data items, organised into pages and relating to a particular topic or subject.

Methods are therefore already known for processing and accessing information objects, especially documents, comprising:

on at least one central site:
  stages of collecting objects previously produced and input,
  stages of classifying the objects thus collected, and
  at least one stage of generating a structured database containing the objects thus classified,
on at least one production site,
  stages of writing the structured database thus generated onto permanent information media,
and, on several local consultation sites,
  stages of accessing one or more objects searched for within the structured database, these accessing stages comprising stages of searching for the objects and stages of reading these objects from a permanent information medium.

On this subject, mention may be made of methods for processing and for accessing the information contained in encyclopaedias or dictionaries, which employ massive prior information input, classifying of this information, for example in alphabetical order or by topic, writing of this processed and classified information onto CD-ROM discs, distribution of these discs and consultation thereof by users on stations equipped with appropriate disc drive means. Mention may also be made of the case of methods for consulting patent databases on CD-ROM disc.

However, a simple adaptation of these known methods for processing and making available complex information, such as information relating to regulations having to be constantly updated and exhibiting several levels of complexity, is difficult to envisage. It would lead to methods which, in the end, would be difficult to handle and which would be cumbersome to manage, especially for updating, when there was a requirement for processing a large number of objects such as documents relating to the international regulations on pharmaceuticals. The processing of such documents, collected from a very large number of sources, subject to frequent updates and exhibiting a geographical, time-based and topic-based dimension, would therefore prove to be expensive and difficult to access with current methods.

The object of the invention is to remedy these drawbacks by proposing a method for processing and accessing information objects which allows, on the one hand, easy updating of the document database intended to be written onto the permanent information media, and, on the other hand, easy access to objects searched for within the database.

According to the invention, the method for processing and accessing information objects, especially documents, comprising:

on at least one central site:
  stages of collecting objects,
  stages of classifying the objects thus collected, and
  stages of generating a structured database containing the objects thus classified,
on at least one production site,
  stages of writing the structured database thus generated onto permanent information media,
and, on several local consultation sites,
  stages of accessing one or more objects within the structured database, these accessing stages comprising stages of searching for the objects on a permanent information medium,
is characterised in that each classification stage comprises:
  a grouping of the collected objects together into groups of objects associated respectively with given geographical areas,
  a categorisation of each object into several types of objects,
  a first classification of the objects belonging to at least one of the types of objects, according to a table of contents including a set of topics and common to all the groups of objects, this table of contents being associated with a first classification scheme known as topic-based classification scheme,
  a second classification, in each group of objects, of some of the collected objects constituting a particular group of objects, according to a second classification scheme, called hierarchical scheme, common to all the groups of objects, and in that each stage of accessing an object further comprises a stage of selecting at least one geographical area followed by a stage of navigating within the selected geographical areas, this navigation stage being capable of covering either of the first and second classification schemes.

The technical effects obtained with the method according to the invention are especially the relevance of the texts with regard to the field dealt with, the freshness and comprehensiveness of the information, whether it relates to regulatory texts or practical information, and the ease of searching for a document of the database.

With the method according to the invention, it becomes possible to adapt to the behaviour of a large number of users, to the various frequencies of their requirements and to their variable knowledge of the field.

According to one preferred implementation of the method according to the invention, the method further comprises, within the central site, a stage of selecting key elements within each collected object, these key elements being grouped together within a thesaurus, and the accessing stages comprising stages of selection according to several criteria including a criterion of selection by key element.

The method according to the invention is preferably implemented for processing and accessing documents, and the collected documents are categorised by type into basic documents, reference documents and notes.

According to another aspect of the invention, a system is proposed for processing and accessing objects, for implementing the method according to the invention, comprising:

on at least one central site:
  means for collecting objects,
  means for classifying the objects thus collected, and
  means for generating a structured database containing the objects thus classified,
on at least one production site,
  means for writing the structured database thus generated onto permanent information media,
and, on several local consultation sites,
  means for accessing one or more objects within the structured database, these accessing means comprising means for searching for the objects on a permanent information medium,
characterised in that the classification means comprise:
means for grouping the collected objects together into groups of objects associated respectively with given geographical areas,
means for categorising each object into several types of objects,
means for carrying out a first classification of the objects belonging to at least one of the types of objects, according to a table of contents including a set of topics and common to all the groups of objects, this table of contents being associated with a first classification scheme known as topic-based classification scheme,
means for carrying out a second classification of some of the collected objects constituting a particular group of objects, according to a second classification scheme called hierarchical scheme, common to all the groups of objects,
and in that the means for accessing an object further comprise means for selecting at least one geographical area and means for navigating within the selected geographical areas, these navigation means being configured so as to cover either of the first and second classification schemes.

Figure 1B:
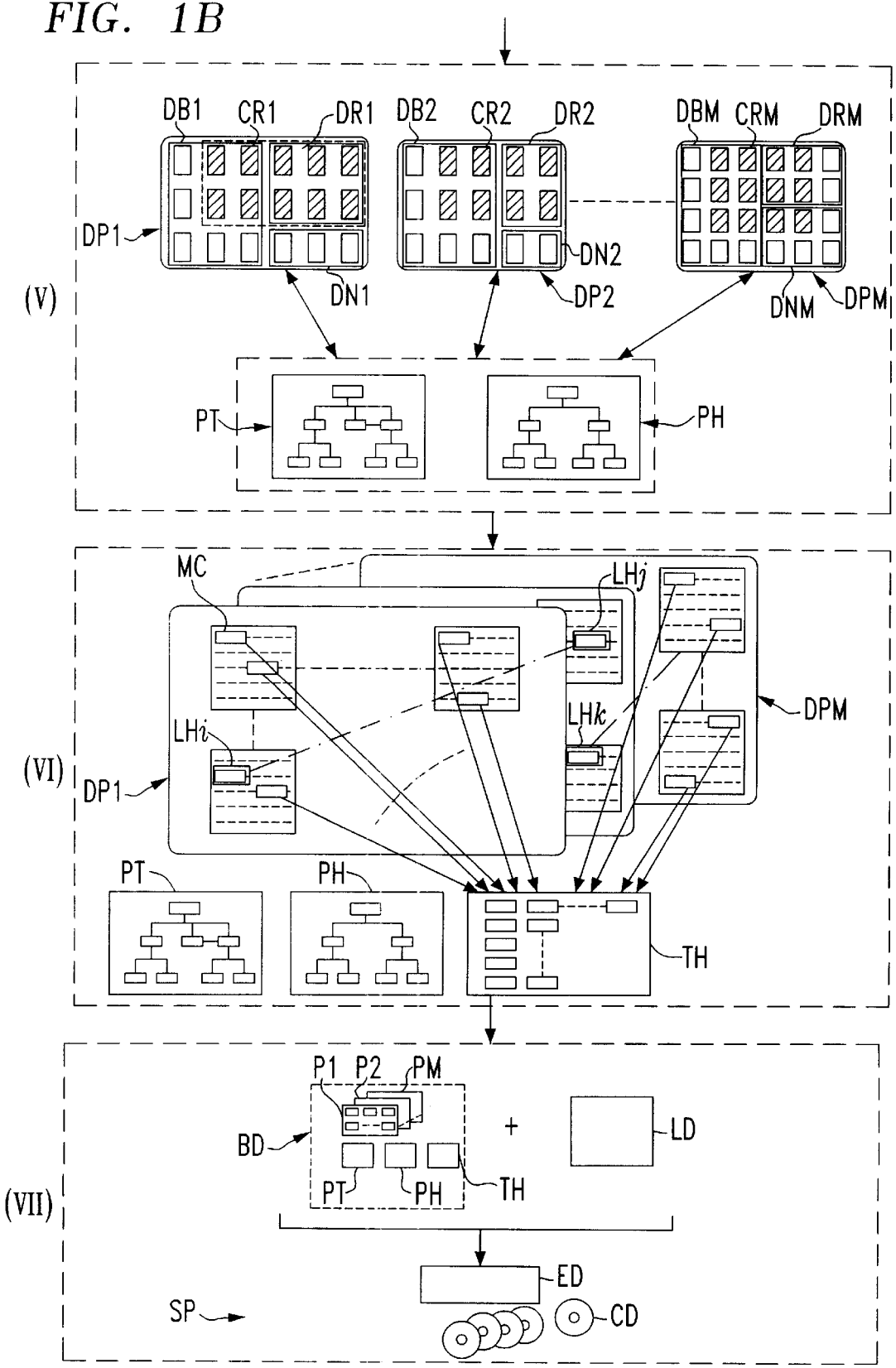
Figure 2:
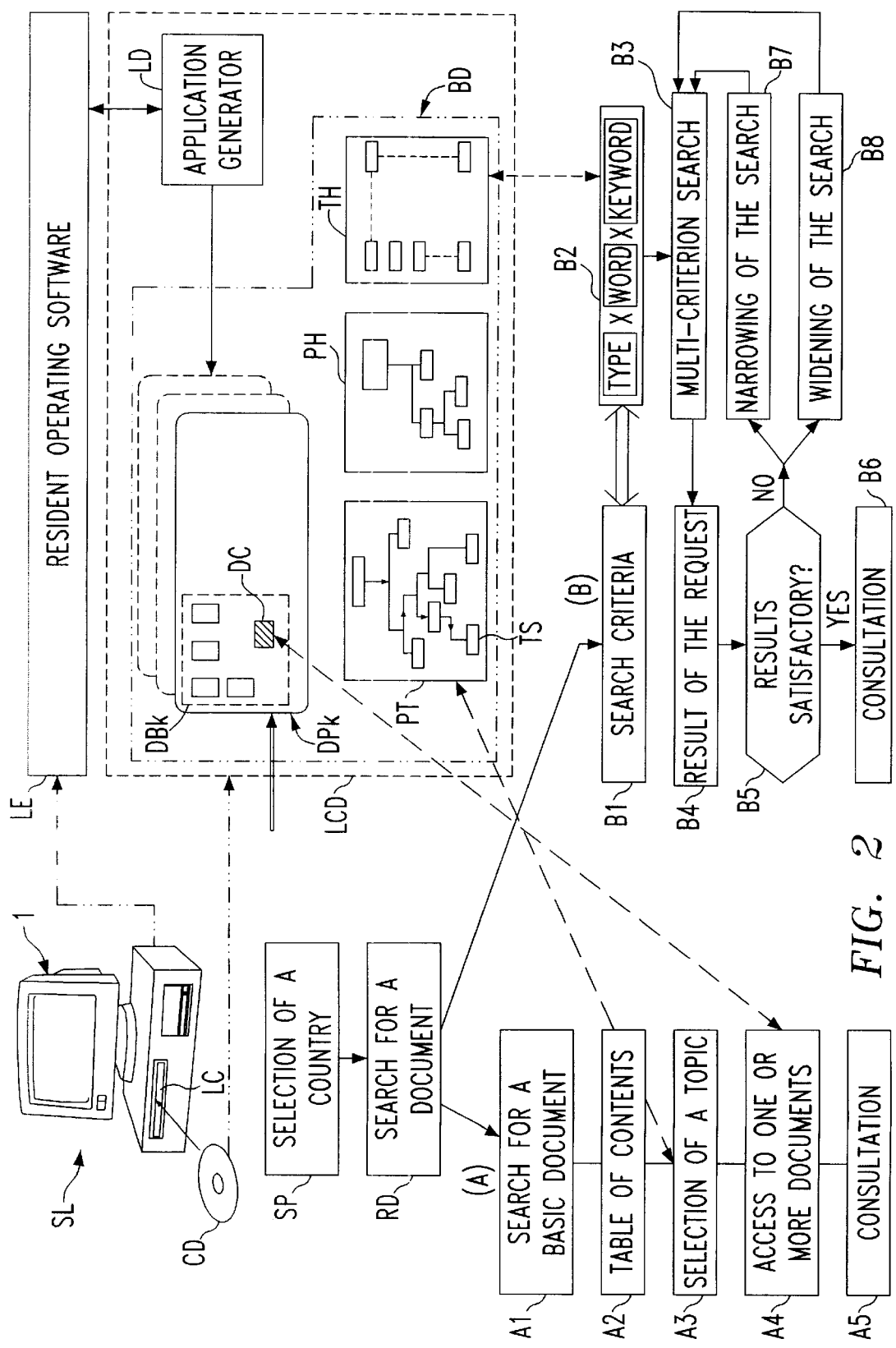

Other features and advantages of the invention will emerge further from the description below. On the attached drawings given by way of non-limiting examples:

FIG. 1, which is divided into FIG. 1A and FIG. 1B, is a block diagram of the processing stages of the method according to the invention, from the collecting of documents to the printing of the permanent information media; and FIG. 2 is a block diagram of the stages of accessing the documents, in the method according to the invention.

A preferred implementation of a processing and access method in accordance with the invention will now be described, at the same time as an exemplary embodiment of a processing and access system for implementing this method, by reference to the abovementioned FIGS. 1 and 2.

In the practical example of implementation of the processing and access method according to the invention, which will be described in what follows, a document database covering regulations on the registration of pharmaceuticals is to be made available to users, this database being consulted on a microcomputer equipped with means for reading CD-ROM discs. In this example, the objects collected, sorted, classified and searched are documents consisting of texts, tables and possibly graphics.

The stages for producing the document database will firstly be described, with reference to FIG. 1. A first stage I of the method according to the invention consists in collecting documents D, within a central site SC, especially documents drawn up by experts R1, Rk, . . . , RN or communicated by authorised bodies and institutions. These collected documents CO are input and formatted according to a common format. A second stage II consists in grouping together RG the various collected documents into several groups of documents DP1, DP2, . . . , DPM by geographical area, in this instance by country P1, P2, . . . , PM and/or by regional area such as the European Union. The following stage III may be a stage of categorising the documents for each country P1, P2, . . . , PM into several types of documents. By way of example, the following types can be envisaged: basic documents DB1, reference documents DR1 and notes DN1. Moreover, this categorisation into types could very well be carried out before the grouping by country.

In a fourth stage IV, the basic documents DB1 are classified according to a table of contents TM which is common to all the countries. The corresponding classification scheme PT is preferably a tree structure of topics including a large number of levels, for example twelve.

The method according to the invention also envisages a stage V of classifying the documents constituting a body of regulations CR1, CR2, . . . , CRM (represented as crosshatched), this classifying being carried out according to a hierarchical scheme PH common to all the countries P1, P2, . . . , PM. This hierarchical scheme PH includes several levels, and may also be structured in tree structure form.

Each document may include one or more keywords MC characterising a subject dealt with and which are intended for multi-criterion searches. These keywords, as well as key expressions, are grouped together with their search alias into a thesaurus TH. Within the documents markers LHi, LHj, LHk are also available, corresponding to hypertext links allowing navigation between different documents of the document database, according to a technique which is well known and widespread nowadays.

Hence, on completion of the abovementioned processing stages I–VI, a document database BD is available, structured by country P1, P2, . . . , PM, with which a table of contents scheme PT, a hierarchical scheme PH and a thesaurus TH are associated.

It should be noted that the abovementioned processing stages I–VI may be carried out in a chronological order other than that which has just been described. Thus, the documents may be allocated keywords and markers for hypertext links before being grouped together by country. The same is true for their categorisation by type, which can also be carried out before the grouping by country.

On completion of processing stages I–VI, in a printing stage VII carried out on a production site SP, the document database BD and a dedicated application generator LD are written according to a known reproduction process ED onto permanent information media CD, such as CD-ROM discs or any other equivalent medium. These media are then distributed to users.

The various accessing stages performed on a local site SL in the course of the use of a document database BD produced with the method according to the invention will now be described by reference to FIG. 2.

After insertion of a disc CD including the document database BD in question into a disc drive LC of a workstation 1 normally provided with resident operating software LE, and starting of this software, the application generator LD and the resident operating software LE cooperate to run the document database. The user preferably has a window-mode presentation available, which is widespread on microcomputers. In a first window, he is generally invited (SP) to select one or more countries. This selection has the effect of distinguishing, in the document database DB, those groups of documents DPk corresponding to the selected country or countries. The user is offered at least two ways of searching (RD) for a document.

A first way (A) consists in carrying out a search (A1) for basic documents by consulting (A2) the table of contents TM. This has the technical effect of navigating dynamically and graphically through the tree structure until the user identifies the topic or topics which interest him. When he has selected (A3) a topic, the method according to the invention indicates the number of documents DC corresponding to this topic, offers access (A4) to these documents and supplies a summary for each of the said documents which the user can consult (A5) with a view to asking for one or more relevant documents to be displayed.

A second way (B) proposed to the user consists of a multi-criterion selection of any document from the document database BD. In a first stage (B1), the user chooses a combination of search criteria (B2) which may especially be:

the type(s) of documents, the word(s) which are to appear in the document, the keyword(s) attached to the document.

The method according to the invention then performs a multi-criterion search (B3) which leads to a result of the request (B4) generally in the form of a number of documents identified as satisfying the chosen combination of criteria. This result allows the user to determine whether the search has been satisfactory (B5), in which case he can consult (B6) the document or documents identified. Otherwise the user may be led either to narrow the search (B7), or to widen this search (B8).

For the multi-criterion search, it is also possible to envisage a logical combination of words leading to a search of the "full text" type. A display of lists presenting the user with possible choices ("full text" index, index of keywords) facilitates the expressing of the search request.

Moreover, when a document consulted by the user includes markers for hypertext links LHi, LHj, LHk, represented by a graphics style, for example colour and/or bold characters, the user can navigate between different documents of the database following the hypertext links linking these documents and representing a logical association between them. These hypertext links result from a cross-analysis carried out by the writers of the documents, and may be of three kinds:

reference links which allow direct access to a text quoted in a source document, structural links which connect together different parts of the same text which has been segmented for easier readability, and comment-based links, particularly allowing access to personal notes which the user can attach to certain documents.

It is also possible to envisage hypertext links offering immediate access to a definition of an expression, or to a meaning of an acronym via a direct call to a glossary incorporated in the document database.

Another search mode offered by the method according to the invention consists in navigating interactively through the hierarchical classification scheme PH of the body of regulations CR1, CR2, . . . , CRM of one or more selected countries P1, P2, . . . , PM, in selecting a document and in displaying it in order to consult it.

The processing and access method according to the invention offers the manager of the document database great flexibility in updating that database. This is because, as and when new documents are received from the experts writing them, these documents can be processed continuously and incorporated into the geographical groups to which they correspond. The new documents are then substituted for the now obsolete or superseded documents, are categorised and incorporated in the appropriate topic-based levels within the tree structure. New editions of constantly updated discs are produced and distributed periodically.

Clearly, the invention is not limited to the examples which have just been described, and many other configurations can be applied to these examples without departing from the scope of the invention. Thus, the numbers of geographical areas, of types of documents and of topics of the table of contents may be chosen on the basis of the users' requirements and of market changes. The permanent information media may be CD-ROM discs, as has just been described, but also CD-I (Interactive Compact Disc) discs or any other permanent information medium, whether it can be rewritten or not.

What is claimed is:

1. A method for processing and accessing information objects, comprising:

on at least one central site:

stages of collecting objects, stages of classifying the objects collected, and stages of generating a structured database containing the objects classified, characterized in that each classification stage comprises:

a grouping of the collected objects together into groups of objects associated respectively with given geographical areas, a categorization of each object into several types of objects, a first classification, in each group of objects, of the objects belonging to at least one of the types of objects, according to a table of contents including a set of topics and common to all the groups of objects, said table of contents being associated with a topic-based classification scheme, a second classification, in each group of objects, of some of the collected objects constituting a particular group of objects, according to a hierarchical classification scheme common to all the groups of objects, and in that it further comprises, within the central site, a stage of selecting key elements within each collected object, said key elements being grouped together within a thesaurus, and in that the accessing stages comprise stages of selection according to at least one criterion including a criterion of selection by key element.

2. The method according to claim 1, further comprising on at least one production site, stages of reproducing the structured database generated on permanent information media, and, on several local consultation sites, stages of accessing one or more objects within the structured database, said accessing stages comprising stages of searching for the objects on a permanent information medium, characterized in that each stage of accessing an object further comprises a stage of selecting at least one geographical area followed by a stage of navigating within the selected geographical areas, said navigation stage being capable of covering either said topic-based classification scheme or said hierarchical classification scheme.

3. The method of claim 2 for processing and accessing documents, characterized in that the collected documents are categorized by type into basic documents, reference documents and notes.

4. The method of claim 1 for processing and accessing documents, characterized in that the collected documents are categorized by type into basic documents, reference documents and notes.

5. A system for processing and accessing objects, comprising:

on at least one central site,
  means for collecting objects,
  means for classifying the objects collected, and
  means for generating a structured database containing the objects classified, on at least one production site,
  means for reproducing the structured database generated on permanent information media, and, on several local consultation sites,
  means for accessing one or more objects within the structured database, said accessing means comprising means for searching for the objects on a permanent information medium, characterized in that the classification means comprise:

means for grouping the collected objects together into groups of objects associated respectively with given geographical areas, means for categorizing each object into several types of objects, means for carrying out, in each group of objects, a first classification of the objects belonging to at least one of the types of objects, according to a table of contents including a set of topics and common to all the groups of objects, said table of contents being associated with a topic-based classification scheme, means for carrying out, in each group of objects, a second classification of some of the collected objects constituting a particular group of objects, according to a hierarchical classification scheme common to all the groups of objects, means for selecting key elements within each collected object and means for grouping said key elements together within a thesaurus.

6. The system according to claim 5, characterized in that said means of accessing an object further comprise means for selecting an object according to at least one criterion including a criterion of selection by key element.

7. The system according to claim 6, characterized in that said means for accessing an object further comprise means for selecting at least one geographical area and means for navigating within the selected geographical areas, said navigation means being configured so as to cover either said topic-based classification scheme or said hierarchical classification scheme.

8. The system according to claim 5 characterized in that said means for accessing an object further comprise means for selecting at least one geographical area and means for navigating within the selected geographical areas, said navigation means being configured so as to cover either said topic-based classification scheme or said hierarchical classification scheme.

* * * * *